US011044225B1

(12) United States Patent
Zhou et al.

(10) Patent No.: US 11,044,225 B1
(45) Date of Patent: Jun. 22, 2021

(54) SYSTEM AND METHOD FOR FACILITATING DISTRIBUTION OF LIMITED RESOURCES HAVING AN ADD GRACE PERIOD

(71) Applicant: Afilias Limited, Dublin (IE)

(72) Inventors: Hui Zhou, Toronto (CA); Shuqin Sun, Toronto (CA); Michael Runcieman, Toronto (CA); Steven Singer, Toronto (CA)

(73) Assignee: AFILIAS LIMITED, Dublin (IE)

( * ) Notice: Subject to any disclaimer, the term of this patent is extended or adjusted under 35 U.S.C. 154(b) by 0 days.

(21) Appl. No.: 17/015,891

(22) Filed: Sep. 9, 2020

(51) Int. Cl.
*H04L 29/12* (2006.01)
*H04L 29/08* (2006.01)

(52) U.S. Cl.
CPC ...... *H04L 61/1511* (2013.01); *H04L 61/3025* (2013.01); *H04L 61/302* (2013.01); *H04L 61/6009* (2013.01); *H04L 67/2842* (2013.01); *H04L 67/2852* (2013.01)

(58) Field of Classification Search
CPC .............. H04L 61/1511; H04L 61/302; H04L 61/6009; H04L 67/2842; H04L 67/2852
See application file for complete search history.

(56) References Cited

U.S. PATENT DOCUMENTS

2018/0287991 A1* 10/2018 Chawat ............... H04L 61/1511

* cited by examiner

*Primary Examiner* — Kyung H Shin
(74) *Attorney, Agent, or Firm* — Haynes and Boone, LLP

(57) ABSTRACT

A method for distributing a domain name to one of a plurality of registrars, in communication with a drop zone server, the method executing stored instructions by a computer processor to: recognize a delete command of the domain name; determine if the delete command is inside or outside of an Add Grace Period (AGP), the AGP defined as a period of time post registration of the domain name by a registrar; if the delete command is inside of the AGP, then send the domain name to the drop zone server in a path that bypasses a delete queue for subsequent purchase by said one of the plurality of registrars; or if the delete command is outside of the AGP, then send the domain to the delete queue.

20 Claims, 7 Drawing Sheets

SYSTEM AND METHOD FOR FACILITATING DISTRIBUTION OF LIMITED RESOURCES HAVING AN ADD GRACE PERIOD

FIELD

The present invention relates generally to the distribution of limited resources, and specifically to a server and method for facilitating the distribution of such resources.

BACKGROUND

A domain name is a name that can be entered into a computing device in order to access a web-site, for example. The domain name is looked up in a global Domain Name System (DNS) which informs the computing device of the Internet Protocol (IP) address for that domain name. The computing device can then access the web-site by contacting a server at the received IP address.

Although assigned to a "domain holder" or "registrant", domain names are controlled by domain name registries. Typically, registration of a domain name is described as follows. Each registry is assigned one or more top-level domains, such as .com, .org, and the like. Most domain registries implement a registry-registrar model for registering the domain names. In this model, the registry only has to manage its relationship with the registrars. In turn, each registrar maintains its relationship with the registrants.

The registrant purchases a domain name from the registrar. The registrar registers the purchase with the registry. The registry updates the DNS to reflect the IP address of the registrant for the purchased domain name. In order to maintain rights to use the domain names, the registrant pays a renewal fee before an annual expiration date.

If the registrant does not renew the domain name by the expiration date, the domain name becomes expired. A grace period is often provided by the registrar before sending a delete request to the registry.

After the grace period, the registrar requests deletion of the domain name from the registry. Upon request of the deletion, the domain name enters a redemption grace period. The redemption grace period, typically 30 days, allows the registrar (and registrant) to restore the domain name from a pending deletion status and further allows them to renew the domain name. However, during this period all Internet services associated the domain name are disabled.

After the redemption grace period, the domain name becomes locked and enters a redemption hold period. The redemption hold period typically lasts for five days. On the last day, the domain name is officially dropped from the registry database and becomes available for registration on a "first-come, first-served" basis.

Importantly, there can be a number of different types of grace periods, which can affect how a domain name can be treated based on the delete command. Another type of grace period, further to the above, can be an Add Grace Period. It is advantageous to treat the renewal or expiration of the domain name properly, depending upon what type of grace period.

Due to the proliferation of the Internet, domain names can be extremely valuable marketing tools. Specifically, domain names that are intuitive can be very useful for a person or company wishing to make information available to the general public. This is a concept that is well known in the art and has led to practices such as domain name speculation.

Accordingly, when a previously used, but desirable domain name becomes available, registrants and, more typically, registrars that are involved in domain name speculation have a great incentive to apply a heavy load on the corresponding registry. Specifically, since domain names are awarded on a first-come, first-served basis, a speculator with the fastest access to the registry, or most number of connections that access the registry, stands the best chance of being the first to register a previously used domain name.

It is desirable for registries to provide relatively equivalent or equal access to previously used domain names that does not favour either large or incumbent registrars in the industry. However, using the first-come, first served model described above rewards registrars with the most powerful equipment or the most number of connections into the registry via multiple proxy registrars. Accordingly, this has resulted in an escalating "arms" race, with competing registrars applying constantly increasing loads against the registry, thereby threatening the ongoing performance and stability of the registry.

For example, the load generated on the registry when registrars attempt to acquire a previously used domain name via the current process is many times greater than that generated during regular registry operations. Therefore, the registry has to be maintained to accommodate a peak bandwidth that is significantly greater than it would typically require for normal operation. Continuing to increase resources at the registry to address this small percentage of competing registrars is an inadequate solution as it provides a continuously escalating additional cost to the registry.

Further, the current process limits fair and equivalent access to the list of previously used domain names being deleted by the registry on a daily basis, as smaller registrars are less likely to have the resources to compete with larger registrars. For example, it is recognised that confusion can arise when a domain name is deleted by a registrar, in particular near to the creation date of the domain name. The nearness in time between the delete event with respect to an Add Grace Period can be problematic, in determining an appropriate entry into a deletion process as is known in the art.

Accordingly, it is an object of the present invention to provide a mechanism for acquiring previously used domain names that obviates or mitigates at least some of the problems described above.

SUMMARY

In accordance with an aspect of the present invention there is provided a method for distributing a domain name to one of a plurality of registrars, in communication with a drop zone server, the method executing stored instructions by a computer processor to: recognize a delete command of the domain name; determine if the delete command is inside or outside of an Add Grace Period (AGP), the AGP defined as a period of time post registration of the domain name by a registrar; if the delete command is inside of the AGP, then send the domain name to the drop zone server in a path that bypasses a delete queue for subsequent purchase by said one of the plurality of registrars; or if the delete command is outside of the AGP, then send the domain to the delete queue.

In accordance with a further aspect of the present invention there is provided a server for distributing a domain name to one of a plurality of registrars, the server in communication with a drop zone server, the server having stored instructions for execution by a computer processor to:

recognize a delete command of the domain name; determine if the delete command is inside or outside of an Add Grace Period (AGP), the AGP defined as a period of time post registration of the domain name by a registrar; if the delete command is inside of the AGP, then send the domain name to the drop zone server in a path that bypasses a delete queue for subsequent purchase by said one of the plurality of registrars; or if the delete command is outside of the AGP, then send the domain to the delete queue.

In the system described above, the drop zone server may further be configured to make a plurality of limited resources available simultaneously.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
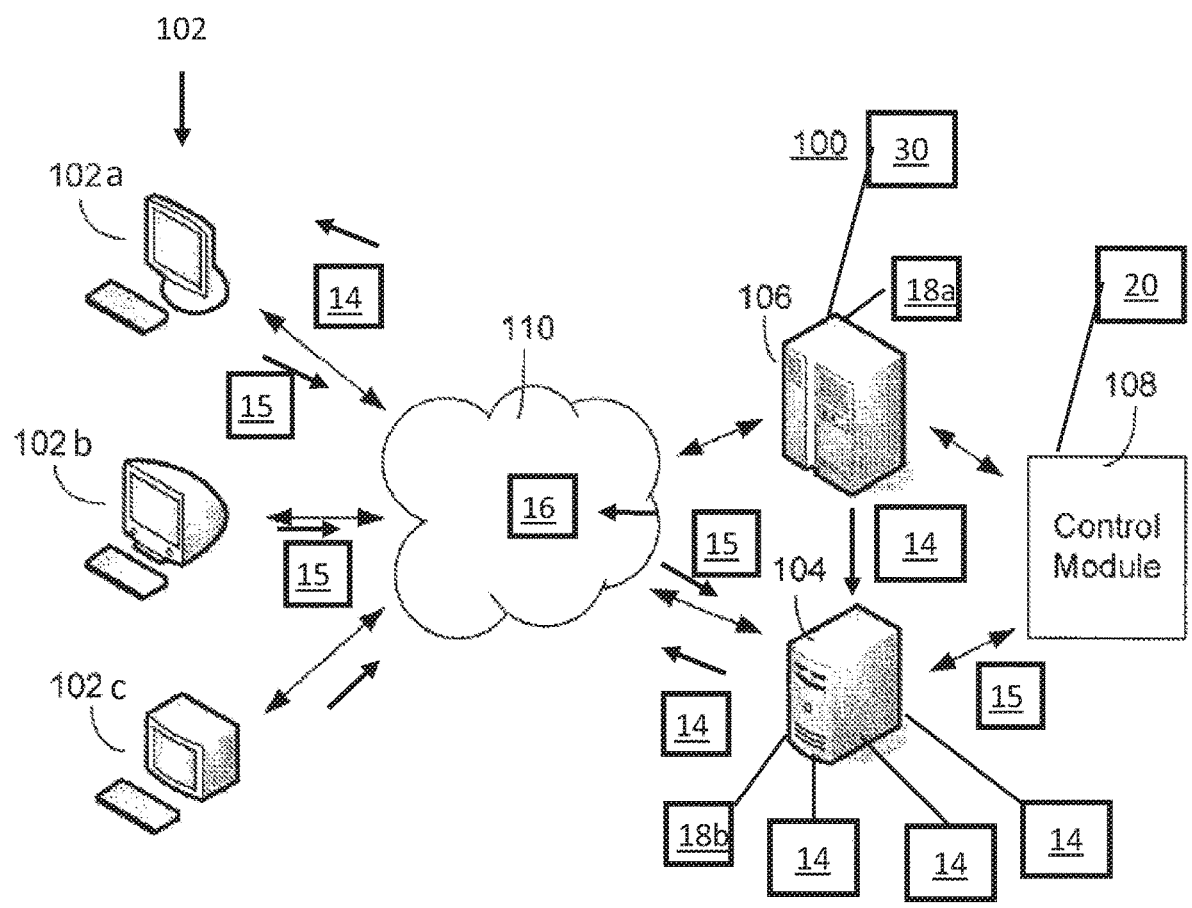
FIG. 1 is block diagram of a drop zone infrastructure.

For convenience, like numerals in the description refer to like structures in the drawings. Referring to FIG. 1, a drop zone infrastructure is illustrated generally by numeral 100. The drop zone infrastructure 100 includes one or more registrars 102, one or more drop zone servers 104, one or more main registry servers 106, and a drop zone control module 108. Using the drop zone infrastructure 100, the plurality of registrars 102a,b,c each send in a registration request 15 (e.g. Domain Create) for a domain name 14 made available via the drop zone server 104. As such, when those domain name(s) 14 become available for purchase by a registrar 102 (via their respective registration request 15), the main registry server 106 (e.g. in conjunction with the control module 106) facilitates availability of the specific domain name(s) 14 to the drop zone server 104 by publishing 16 their availability for purchase, as further described below. Once reported available via the publication 16, the drop zone server 104 can manage the purchase of a particular domain name 14 by one of the registrars 102a,b,c, upon receipt of typically multiple registration requests 15 for that same domain name 14, giving the timing of the availability of the domain name 14 for purchase as provided for in the publication 16. As such, only one of the registrars 102a,b,c would ultimately be able to request 15 and successfully purchase the domain name 14, recognising that multiple registrars 102a,b,c can compete and each request in parallel for the domain name 14 when available from the drop zone server 104.

As shown by example in FIG. 1, registrars 102a,b,c each request 15 the domain name 14 from the drop zone server 104, however only registrar 102a successfully obtains the domain name 14 in response to the registrar's 102a request 15 (e.g. decided on by a first come first serve basis). In general, the drop zone server 104 has available at any one time a plurality of domain names 14, as specified in the publication 16, such that each of the available domain names 14 would be awarded to one of the plurality of registrars 102a,b,c by processing a respective registration request 15 of that successful registrar 102. The publication 16 can be provided by the main registry server 106, the drop zone server 104 and/or the control module 108, as desired.

The registrars 102 are in communication with both the drop zone server 104 and the main registry server 106 via a communication network 110. As will be appreciated, the communication network 110 may be a wide-area network (WAN), such as the Internet, or a local-area network (LAN). For example, the publication 16 would also be provided to the registrars 102 via the communication network 110.

The drop zone server 104 is in communication with the drop zone control module 108, which is in communication with the main registry servers 106. Although the drop zone control module 108 is illustrated as a separate device, it will be appreciated that it can be incorporated as part of either the drop zone server 104 or the main registry server 106. Further, the registrars 102 have a corresponding account set up with either the drop zone server 104 or main registry server 106, or both, to facilitate payment of services used to acquire ownership (and associated maintenance) of one or more domain names made available to the registrar(s) 102 via the drop zone server 104. Different configurations of the drop zone infrastructure 100 will become apparent to a person of ordinary skill in the art.

Effectively, the drop zone server 104 provides a limited registry system. Accordingly, the drop zone server supports a limited number of commands. In the present embodiment, the drop zone server 104 supports three primary commands (e.g. using an EPP protocol): Login; Domain Create; and Extensible Provisioning Protocol (EPP) Hello. EPP provides a standard Internet domain name registration protocol for use between the registrars 102 and the main registry server 106. EPP is well known in the art and need not be described in detail. The Login command is used by the registrars 102 to access the drop zone server 104. Domain Create is used to request a domain name. EPP Hello is used to verify connectivity by the registrars 102 to the drop zone servers 104.

The drop zone control module 108 controls the distribution of requested domain names 14 in accordance with available domain names 14 and registration requests 15 submitted to the drop zone servers 104, as will be described. Accordingly, it will be appreciated that the main registry servers 106 can be used primarily for tasks such as maintaining the DNS registry and servicing DNS resolution queries. Connectivity to the drop zone server 104 can be highly limited and equivalent between registrars 102. For example, each registrar 102 can be limited to three connections to the drop zone server 104. This affords scalability and the ability to maintain separate connectivity policy 18a for the drop zone server 104 and connectivity policy 18b for the main registry server 106. The connectivity policy 18a can be used to define the number of connections allowed at one time between a particular registrar 102 and the respective server 106. Accordingly, an excess number of connection requests from a particular registrar 102 would be inhibited (e.g. not allowed) by the main server 106, thus any such excess connection requests received by the main server 106 would not be processed (e.g. an error message would be returned to the registrar 102 upon receipt by the main server 106 of such a restricted excess connection—e.g. number of connections with a particular registrar 102 greater than a defined number). The connectivity policy 18a can be used to define the type of network 110 communication/command/ request allowed between a particular registrar 102 and the respective server 106, e.g. set up an account with the main registry server 106, and other EPP commands such as Delete domain, Renew domain, etc. The connectivity policy 18a could also restrict (e.g. not allow) command types such as Domain Create pertaining to purchase of the domain names 14 made available via the publication 16. Accordingly, for example such as Domain Create, this command would be inhibited (e.g. not allowed) to be submitted from the registrars 102 to the main server 106, thus any such restricted commands received by the main server 106 would not be processed (e.g. an error message would be returned to the registrar 102 upon receipt by the main server 106 of such a restricted command type).

The connectivity policy 18b can be used to define the number of connections allowed at one time between a particular registrar 102 and the respective server 104, such that the number of connections for the server 104 can be different from the number of connections for the server 106. The connectivity policy 18b can be used to limit the type of network 110 communication allowed between a particular registrar 102 and the respective server 104, e.g. EPP commands such as Domain Create, Hello, and Login pertaining to purchase of the domain names 14 made available via the publication 16. Accordingly, other commands, such as Delete Domain, would be inhibited (e.g. not allowed) to be submitted from the registrars 102 to the drop zone server 104, thus any such restricted commands received by the drop zone server 104 would not be processed (e.g. an error message would be returned to the registrar 102 upon receipt by the drop zone server 104 of such a restricted command type).

Figure 5:
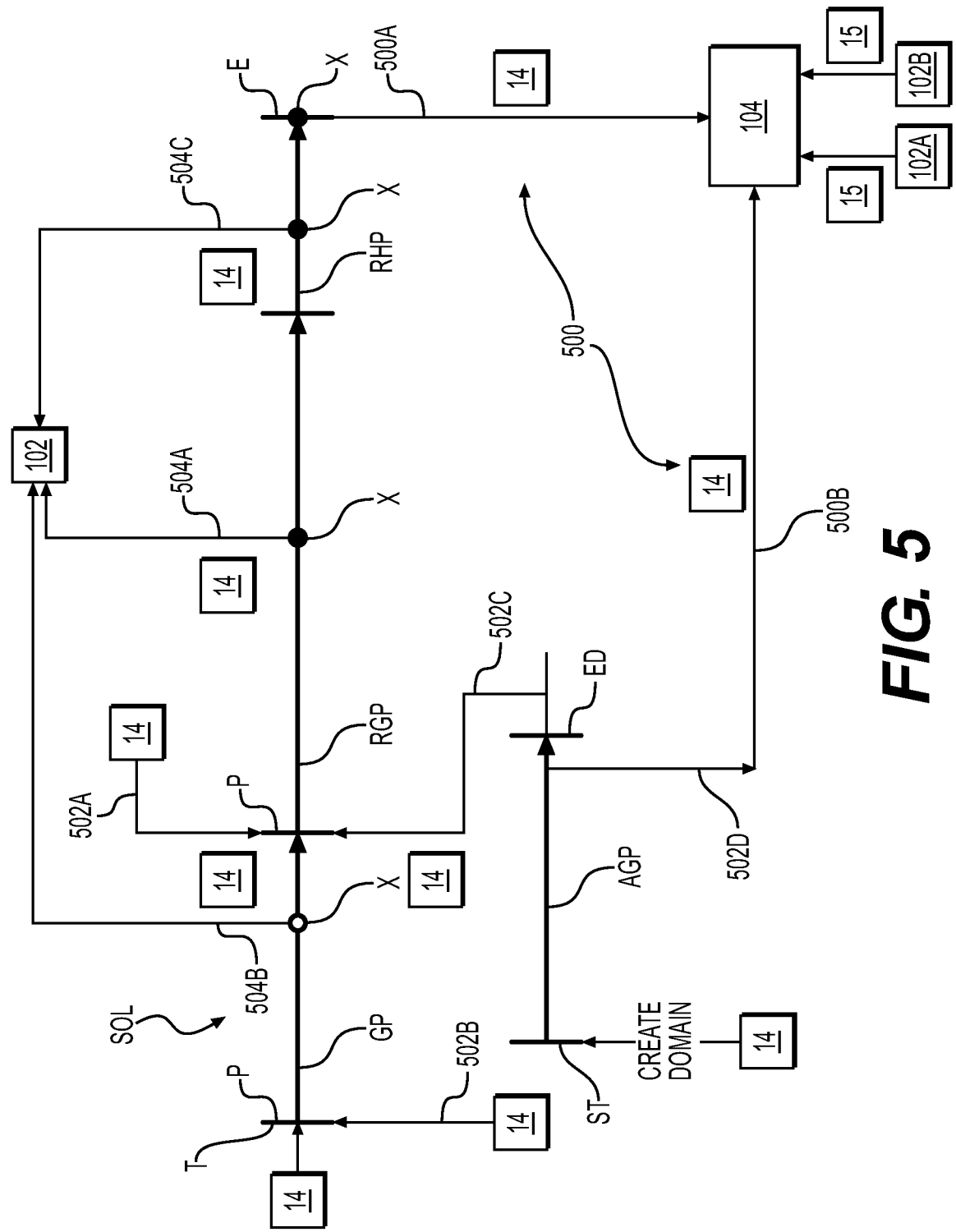
FIG. 5 is diagram of various periods relating to different Delete processes for a domain name of the system of FIG. 1.

Further, it can be seen that the drop zone server 104 provides a segregated system from the main registry server 106 for managing a synchronized full release of previously used domain names 14 that have reached the end of their redemption hold periods (RHP—see FIG. 5, as part of the delete queue 501). Registrars 102 will be less likely and will have less incentive to maintain a high number of connections to the main registry server 106 for catching a domain name 14 when previously used domain names 14 are released, or dropped via the drop zone server 104. In general, it is recognised that he delete queue 501 can have any number of periods contained therein, as by example only a Grace Period GP, a Redemption Grace period RGP and a redemption Hold Period RHP. In any event, it is recognised that a domain name 14 can enter the delete queue 501 at any point, as configured, e.g. in response to a delete command 502a,b,c as further described below, and can leave the delete queue 501 either by being released to the drop zone server 104 (e.g. via drop zone server entry point 500a) or being reclaimed by the registrar 102 (e.g. by request 504a,b,c), as desired. It is recognised that the delete queue 501 can have more, less, or different periods GP, RGP, RHP as described by example. What is important, is whether the domain name 14 enters the queue 501 (e.g. in response to a delete command 502a,b,c) or otherwise bypasses the delete queue 501 (e.g. in response to a delete command 502d) and therefore uses one of two available drop zone server entry points 500a,b. The determination of which entry point 500a,b can be based on whether the domain name 14 is within or outside of aa Add Grace Period AGP, as further described below.

Figure 2:
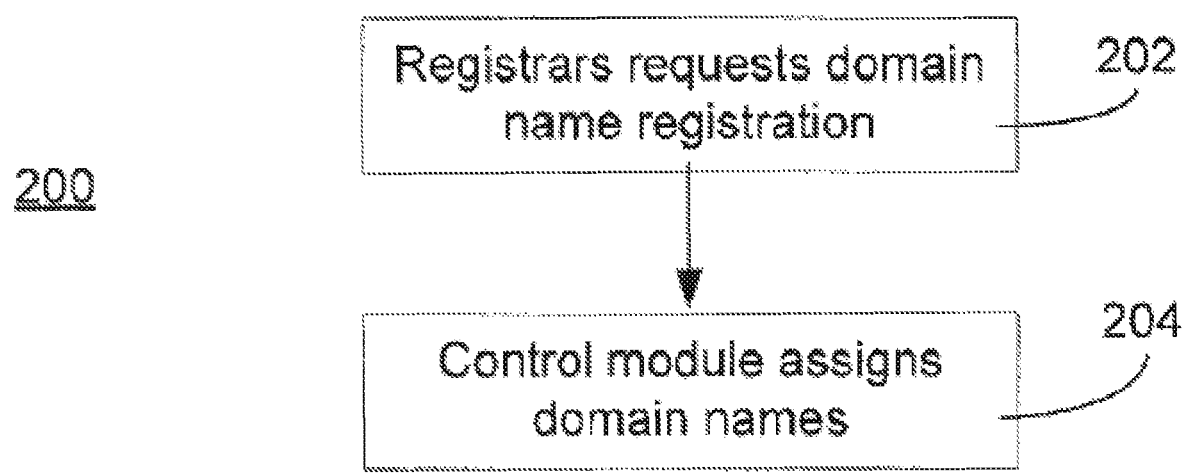
FIG. 2 is a flow chart illustrating a registration process for previous used domain names that become available.

Referring to FIG. 2, a flow diagram illustrating a process for registering a domain name 14 using the drop zone infrastructure 100 is shown generally by numeral 200. In step 202 the registrars 102 submit registration requests 15 to the drop zone server 104 for previously used domain names 14 available for registration. In step 204, the drop zone control module 106 parses the registration requests 15 received by the domain name server 104 and assigns the previously used domain names 14 accordingly based on one or more criteria 20 (e.g. on a first come first serve basis, based on the availability of deposit account funds with the main registry server 106, registrar 102 being eligible to participate in purchasing of the requested domain name 14, etc.). Both of these steps 202 and 204 are described in greater detail with reference to FIGS. 3 and 4.

Figure 3:
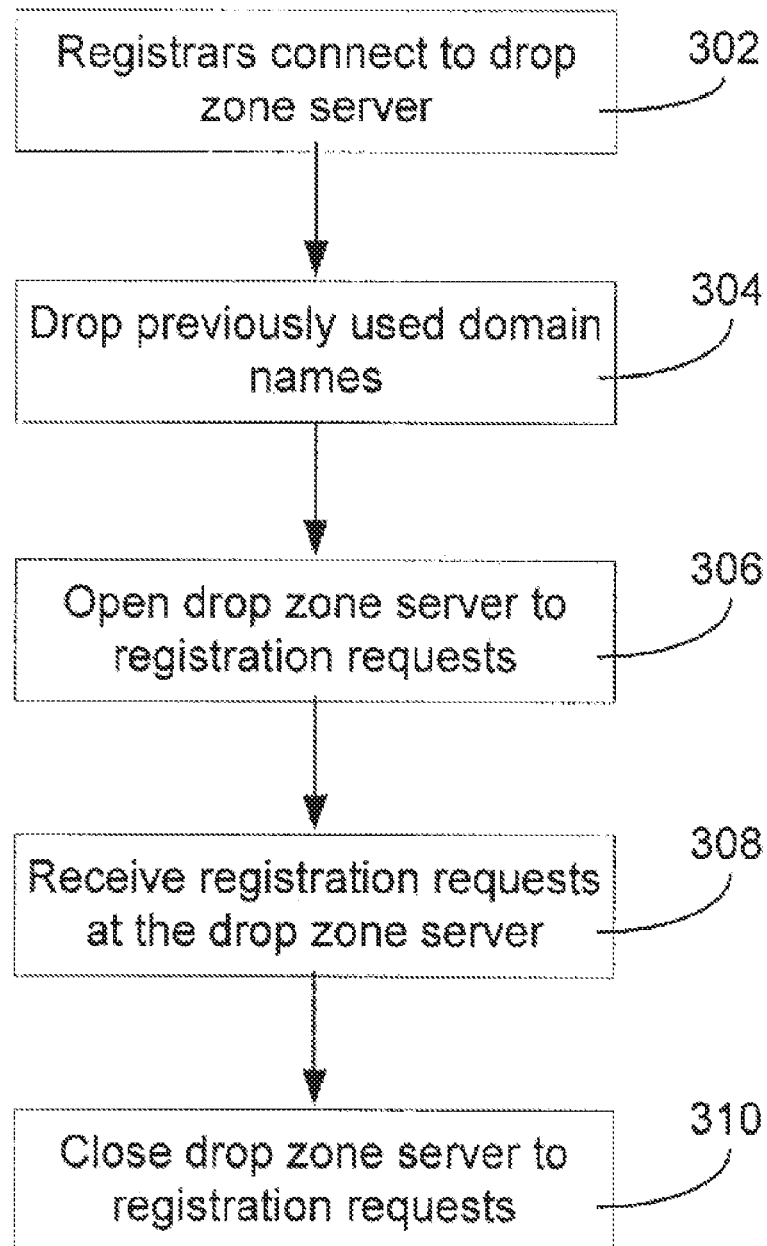
FIG. 3 is a flow chart illustrating the registration request process of FIG. 2 in greater detail.

Referring to FIG. 3, a flow diagram illustrates the step 202 of requesting registration of a previously used domain name 14 in greater detail. In step 302, the registrars 102 connect with the drop zone server 104. The registrars 102 are initially able to test their connectivity to the drop zone server 104 using the EPP Hello command. However, an attempt to register a previously used domain name 14 at this point, using the Domain Create command, would result in an error.

In step 304, a plurality of previously used domain names 14 for which the redemption hold period RHP is expiring that day is made accessible for registration simultaneously to all registrars 102. In the present embodiment, the term day refers to a calendar day, although it will be appreciated that it can be any predefined time period. Further, in the present embodiment, all previously owned domain names 14 for which the end point E of the delete queue 501 (e.g. redemption hold period RHP—see FIG. 5) is reached or is about/ expected to be reached. In any event, any domain name(s) 14 that are considered to be expiring (e.g. that day) by a cut-off time for an upcoming drop zone session (as implemented by the drop zone server 104 in cooperation with the main registry server 106 and registrars 102) are made accessible (e.g. via advance notice facilitated by the publication 16).

In step 306, at a predefined time (e.g. as defined in the publication 16) that allows the registrars 102 to have established a connection (via the published drop zone session and available domain name(S) 14 thereby) with the drop zone server 104, a change is made to the status of the drop zone server 104 and it is opened for domain name 14 registration (e.g. for those domain names 14 listed in the publication 16 as being made available at the defined/specified time of the drop zone session in the publication 16). Once the drop zone server 104 opens, the registrars 102 can submit registration requests 15 for desired domain names 14 as listed/included in the respective publication 16. The registrars 102 may only register for previously used domain names 14 listed for release that day as per the publication 16. This information is made available to each of the registrars 102 by a (e.g. daily) published domain reports/publications 16, provided to all registrars 102 (e.g. via the communications network 110).

At step 308, the drop zone server 104 records the received registration requests 15 and maintains them in the order in which they are received, for example, as defined in the criteria 20. As will be appreciated by a person skilled in the art, this can be achieved in a number of different ways. For example, the registration requests 15 may be maintained in a first-in-first-out (FIFO) queue. Alternatively, the time the registration request 15 is received is stored along with the registration request 15. In this example, the resolution of the time is sufficient to distinguish between consecutive registration requests 15. Accordingly, since the order of the registration requests 15 is maintained, the drop zone server 104 can accept duplicate registration requests 15.

In the present embodiment, it is the responsibility of the registrar 102 to provide that the registration request 15 is for an available previously used domain name 14, as listed in the respective publication 16. If the registrar 102 submits an incorrect registration request 15, for example, for a domain name 14 not in the published report 16, the request 15 results in an error and is not processed by the drop zone control module 108. Optionally, the registrar 102 is advised of the error via an error message from the drop zone server 104.

In step 310, after a predefined time a change is made to the status of the drop zone server 104 and it is closed to domain name 14 registrations for that day/period. As an example, the drop zone server 104 remains open for two hours. However, it will be appreciated that since all previously owned domain names 14 available for registration are released simultaneously, they will likely be spoken for within a shot period of time (e.g. several minutes).

Figure 4:
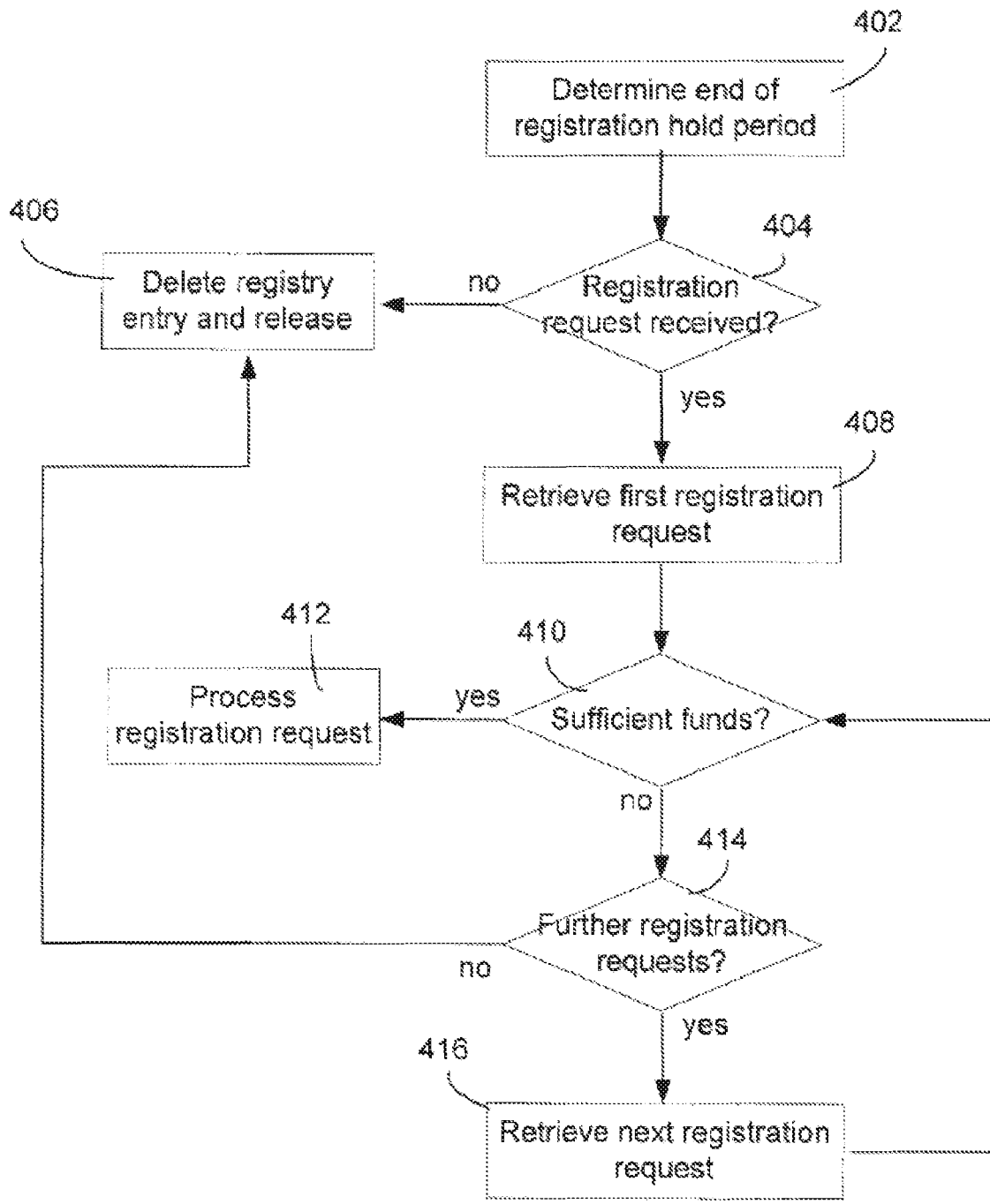
FIG. 4 is a flow chart illustrating the registration fulfillment process of FIG. 2 in greater detail.

Referring to FIG. 4, a flow diagram illustrates the step 204 of assigning a previously owned domain name 14 in greater detail. In step 402, the drop zone control module 108 determines which previously owned domain names 14 maintained by the main registry server 106 are eligible for inclusion in the publication 16 (e.g. completing their redemption hold period RHP or deleted during/within the Add Grace Period (AGP), etc.) that day. For example, step 402 can be referred to as the starting point of the process outlined in FIG. 4, also referred to as determine the domain name(s) 14 in the drop zone (e.g. held by the drop zone server 104).

Referring to FIG. 5, shown are the example entry points 500 to the drop zone server 104 of the domain name(s) 14, which are made available from the main registry server 106, as further described below.

In general, a particular, management of domain name 14 can be affected via EPP commands to transform domain objects (e.g. domain names 14), five principal ones being: <create> to create an instance of a domain object, <delete> to delete an instance of a domain object, <renew> to extend the validity period of a domain object, <transfer> to manage domain object sponsorship changes, and <update> to change information associated with a domain object.

For example, it is the <create> command that is contained in the registration request 15, as processed by the control module 108. In addition to the standard EPP command elements, the <create> command would/could contain a <domain:create> element that identifies the domain namespace 14. The <domain:create> element can contain the following child elements: a <domain:name> element that contains the fully qualified name of the domain object (e.g. name 14) to be created; an OPTIONAL <domain:period> element that contains the initial registration period of the domain object. A server may define a default initial registration period if not specified by the client; an OPTIONAL <domain:ns> element that contains the fully qualified names of the delegated host objects or host attributes (name servers) associated with the domain object to provide resolution services for the domain; an OPTIONAL <domain:registrant> element that contains the identifier for the human or organizational social information (contact) object to be associated with the domain object as the object registrant; zero or more OPTIONAL <domain:contact> elements that contain the identifiers for other contact objects to be associated with the domain object; and <domain:authInfo> element that contains authorization information to be associated with the domain object.

It is recognised that once the domain name 14 is obtained by the registrar 102 through the <create> command, e.g. as processed via the registration request 15, the registrar 102 would then be responsible for maintaining the acquired domain name 14 via the main registry server 106. For example, the registrar 102 (e.g. on behalf of the registrant of the domain name 14) could submit various EPP commands 22 to the main registry server 106, as provided for in the connection policy 18a. One of the commands that can be processed by the main registry server 106, for a specified domain name 14, is the Delete domain command.

This Delete domain command can be generated in a number of different ways. Referring to FIG. 5, shown is a delete queue 501 for facilitating transfer of a particular domain name 14 from the main registry server 106 to the drop zone server 104 (via the publication 16). The delete queue 501 is defined from a begin point T (e.g. the defined expiry date of the domain name 14) and an end point E (e.g. the end of the redemption hold period RHP). It is recognised that there can be one or more different entry points P (as facilitated by various delete commands 502a,b,c as further described below) for a domain name 14 to enter the delete queue 501. It is also recognised that there can be a number of exit points X (as facilitated by various remove requests 504a,b,c as further described below) for a domain name 14 to leave the delete queue 501 before the end point E (also referred to as an exit point X). Once the domain name 14 reaches the end point E of the delete queue 501, the domain name 14 is passed to the drop zone server 104 for subsequent purchase by the registrars 102, by drop zone entry point/path 500a. It is recognised that the anticipated reaching of the end point E (of the delete queue 501) by the domain name 14 would be added to the content of the publications 16, and thus distributed to the registrars 102 in advance of opening the drop zone server 104 for purchase of the domain name 14 (see FIGS. 3,4).

One way to have the domain name 14 to enter the delete queue 501 is for the registrar 102 to submit an intermediate <delete> command 502a for a particular domain name 14 to the main registry server 106. This intermediate <delete> command 502a could be sent by the registrar 102 to the main registry server 106 after the domain name 14 has been registered by the registrar 102 (with the main registry server 106) but before the specified end of term (e.g. expiry date also referred to as entry point T) for the domain name 14 (e.g. the registrar 102 has decided to cease ownership of the domain name 14 prior to reaching the expiry/renewal date of the domain name 14). At this point, the domain name 14 would enter the delete queue 501 (e.g. into a redemption grace period (RGP)), for a defined period of time (e.g. 30 days). During this RGP, the registrar 102 could be able to submit a reverse request 504a of the previously submitted intermediate <delete> command 502a (i.e. the registrar 102 would indicate the desire to resume ownership of the domain name 14) and thus could resume maintenance of the domain name 14 with the main registry server 106 (e.g. by paying the required renewal fee, etc.). In this manner, the domain name 14 would be removed from the delete domain queue 501 and would be diverted from being passed to the drop zone sever 104 (e.g. would not be published in the publication 16). For example, by using the intermediate <delete> command 502a, the domain name 14 could skip a Grace Period (GP) portion of the delete queue 501, as desired.

Alternatively, the domain name 14 can enter the delete queue 501 by a generated expiry <delete> command 502b, e.g. by the main registry server 106, in the event that the registrar 102 fails to renew the domain name 14 at the defined end of term (e.g. domain expiry date), also referred to as T which can be the same as the start point of the delete queue 501). For example, there can be the grace period GP of the delete queue 501, optionally provided by the main registry server 106 to the registrar 102 before the domain name 14 ultimately enters the RGP period. Further, during this GP period, the registrar 102 could be able to submit a reverse request 504b of the expiry <delete> command 502b (i.e. the registrar 102 would indicate the desire to resume ownership of the domain name 14 and pay the renewal fee—e.g. by submitting the appropriate EPP command to the main registry server 106 for the domain name 14) and thus would resume maintenance of the domain name 14 with the main registry server 106. In this manner, the domain name 14 would be removed from the delete domain queue 501 and would be diverted from being passed to the drop zone sever 104 (e.g. would not be published in the publication 16).

Alternatively, the domain name 14 can enter (e.g. via the RGP) the delete queue 501 by submitting (to the main registry server 106) a post AGP <delete> command 502c (e.g. submitted by the registrar 102 to the main registry server 106) after the expiry of an Add Grace Period AGP. The AGP is a period of time, e.g. 5 days, which can be measured from when the domain name 14 is purchased (e.g. obtained by a domain create command—in the registration request 15—by the registrar 102 via the drop zone server 104). The manner of obtaining the domain name 14 by the registrar 102 from the drop zone server 104 is described by example in FIGS. 3,4. It is also recognised that the domain name 14 could have been acquired by the registrar 102 from the main registry server 106 by a process other than by the drop zone server 104 (e.g. in purchasing a new domain name 14 rather than a previously owned domain name 14). The AGP period is provided as a defined period of time (e.g. 5 days) post acquisition (e.g. purchase) of the domain name 14 by the registrar 102, thus having a start point ST and an point ED. However, if the registrar 102 decides to submit a pre AGP <delete> command 502d, i.e. before the expiry of the AGP period, then the domain name 14 bypasses the delete queue 501 and is diverted to the drop zone server 104 (as well as being included in the publication 16 for the respective upcoming drop zone session). As such, for any domain names 14 deleted by the registrar 102 (or otherwise) before the expiry of the AGP period, the domain name 14 is not eligible for inclusion in the delete queue 501 and is thus diverted to the drop zone server 104 for the next scheduled purchase period (as dictated by the publication 16).

Once the RGP period of the delete queue 501 is over for the domain name 14 (e.g. the domain name 14 was resident in the RGP period for 30 days), the domain name 14 can enter a Redemption Hold Period (RHP) of the delete queue 501. For example, the RHP can be a fixed period of time as specified by the main registry server 106 (e.g. 5 days). It is recognised that the RHP can be less than the RGP. It is recognised that the registrar 102 can request 504c from the main registry server 106 to resume ownership of the domain name 14 and thus remove the domain name 14 from the delete queue 501 before reaching the queue end E. It is recognised that the request 504c may take a form other than a straight forward EPP request.

In view of the above, once the domain name 14 reaches the end point E of the delete queue 501, the domain name is then passed to the drop zone server 104 for purchase by the registrars 102, via the submitted registration requests 15 (as decided upon by the control module 108).

Referring again to FIG. 5, the delete commands 502a,b, c,d can be in the form of a <delete> command according to a command protocol, e.g. EPP. For example, the EPP <delete> command provides a transform operation that allows a client to delete a domain object (e.g. the domain name 14). In addition to the standard EPP command elements, the <delete> command would contain a <domain:delete> element that identifies the domain namespace (i.e. name 14). The <domain:delete> element contains the following child elements: a <domain:name> element that contains the fully qualified name 14 of the domain object to be deleted.

Referring again to FIG. 4, at step 404, as the domain name 14 reaches the end of the delete queue 501 (e.g. redemption hold period RHP), the domain name 14 is considered as expired. The drop zone control module 108 determines if a corresponding registration request 15 was submitted to the drop zone server 104. If no corresponding registration request 15 was received for the previously used domain name 14, the process continues to step 406. In step 406, the previously used domain name 14 is deleted from the main registry server 106 and released in a manner that is standard in the art.

If a corresponding registration request 15 was received for the previously used domain name 14, the process continues to step 408. In step 408, the drop zone control module 108 retrieves the first received registration request 15 for the previously used domain name. In step 410, the drop zone control module 108 determines whether or not the registrar 102 that submitted the registration request 15 has sufficient funds in its corresponding account to pay for the registration request 15.

If there are sufficient funds in the account, the drop zone control module 108 continues to step 412. In step 412, the drop zone control module 108 processes the registration request 15. That is, old registration information for the previously used domain name 14 is deleted and replaced with new registration information provided by the registrar 102, thus resulting in completing the purchase/acquisition (also referred to as assignment) of the domain name 14 to the registrar 102 (e.g. registrar 102a in FIG. 2). The registrar's 102 corresponding account with the main registry server 106 is charged for the registration of the domain name 14.

If, however, there are insufficient funds in the account, the drop zone control module 108 continues to step 414. In step 414, the drop zone control module 108 determines if there are any further registration requests 15 for the previously used domain name 14.

If there are no further registration requests 15 for the previously used domain name 14, the drop zone control module 108 continues to step 406 and the previously used domain 14 is released as described above. If, however, there are further registration requests 15 for the previously used domain name 14, the drop zone control module 108 continues to step 416. In step 416, the drop zone control module 108 retrieves the next sequential registration request 15 from the drop zone server 104.

As previously described, in the present embodiment, the sequence in which the duplicate registration requests 15 are received by the drop zone server 104 is maintained. The drop zone control module 108 returns to step 410 to determine whether or not the registrar 102 that submitted the next sequential registration request 15 has sufficient funds in its corresponding account to pay for the registration request 15. This process is implemented for the previously used domain names 14 listed in the daily (e.g. redemption hold period) report 16 for that particular day.

The registrar 102 is informed that the registration request 15 was successful via a daily result report. The daily result report lists the results following the completion of the distribution process described above. In the present embodiment, the daily result report is private to each registrar 102. After this point the registrar 102 can confirm the registration of the previously used domain name 14 with the main registry server 106.

Accordingly, it will be appreciated that registration of previously used domain names 14 as described above improves the fairness in which the domain names 14 are distributed. Specifically, since the number of connections per registrar 102 can be significantly limited and a plurality of domain names 14 become available simultaneously, the registrars 102 have to prioritize the previously used domain names 14 for which they will attempt to register. This feature increases the odds that previously used domain names 14 will be distributed more evenly amongst the registrars 102.

Although the previous embodiment relates specifically to the distribution of previous used domain names 14, a person skilled in the art will appreciate that the invention need not be so limited. Rather, the same solution may be implemented to solve similar problems. That is, when there are a number of different bidders competing for limited resources the solution described above may be implemented.

For example, consider the case where the limited resources are newly released domain names 14. This may occur with the release of a new top-level domain 14 or with the release of previously withheld domain names 14 for an existing top-level domain 14. Such a release would result in a similar problem as the release of previously used domain names 14. Accordingly, the system and method described above could be implemented to facilitate distribution of these domain names 14.

Figure 6:
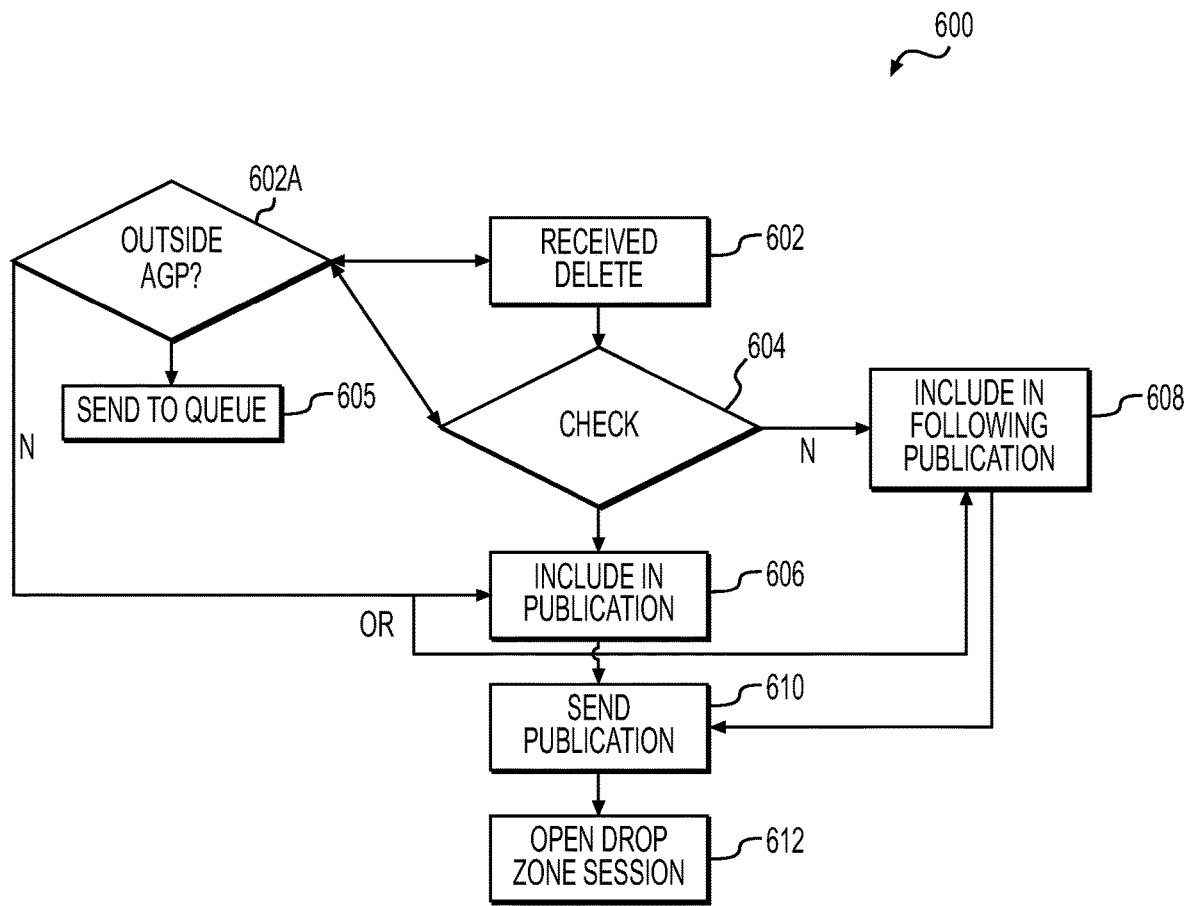
FIG. 6 is a flow chart illustrating an alternative embodiment of the registration fulfilment process of FIG. 2.

Referring to FIGS. 5 and 6, shown is an example operation of a management process 600 of the delete queue 501, including coordinating (e.g. via the main registry server 106) the utilization of multiple entry point(s) 500 of a domain name 14 to the drop zone server 104. For example, the entry point 500*a* is when the domain name 14 reaches the end point E of the delete queue 501 and is thus passed to the drop zone server 104. Alternatively, entry point 500*b* is where the domain name 14 is deleted during the AGP period and thus is passed to the drop zone server 104 in a path that bypasses the delete queue 501. It is recognised that depending upon the delete command 502*a,b,c* utilized by the drop zone infrastructure 100, the domain name 14 can enter via one or more different points P into the delete queue 501 (e.g. via the GP period at beginning point T or via the RGP period resulting from a delete command 502*a,c* generated by the registrar 102). In any event, it is recognised that the delete queue has a beginning point T and end point E, such that the domain name 14 can enter the delete queue 501 between or on the points T,E, as desired. Further, the GP period can be optional. Further, the RGP period can be optional or otherwise included as part of the RHP period, as desired.

At step 602, the main registry server 106 (or other server operating on behalf of the main registry server 106) receives the delete command 502*d* or determines that that the domain name 14 is at or near the end point E. Then, the server 106 checks 604 a cut off period, in order to determine if the domain name is eligible to be included in the next upcoming drop zone session administered by the drop zone 104. For example, the cut-off period/time could be 3 pm for the next day's drop zone session. If the delete command 502*d* was received before 3 pm or the domain name 14 is considered at or near the end point E before 3 pm, then the domain name 14 is included 606 in the publication 16 for the next day's drop zone session. If the delete command 502*d* was received after 3 pm or the domain name 14 is considered at or near the end point E after 3 pm, then the domain name 14 is not included in the publication 16 for the next day's drop zone session, rather the inclusion of the domain name 14 is scheduled 608 for the next publication 16 (e.g. associated with the following drop zone session).

At step 602, the server 106 receives the delete command 502*a,b,c,d* and checks 602*a*/compares a time ID/stamp (e.g. the receipt/generation time) of the delete command 502*a,b,c,d* against a domain create list 30 (see FIG. 1). For example, the domain create list can contain create dates for each of the domain names 14. If the time ID of the delete command 502*a,b,c,d* is outside of the AGP period (e.g. as measured from the create date of the domain name 14), then the server 106 considers the delete command as the post AGP <delete> command 502*c* and sends 605 the domain name 14 to the delete queue 501. Alternatively, if the time ID of the delete command 502*a,b,c,d* is inside of the AGP period (e.g. as measured from the create date of the domain name 14), then the server 106 considers the delete command as the pre AGP <delete> command 502*d* and sends the domain name 14 to be included in the next appropriate publication 16 and thus drop zone session (i.e. in a path that bypasses the delete queue 501). It is also recognised that the server 106 could also check 604 (at step 602*a*) whether the cut off period has been reached or not, thereby dictating whether to send to the include publication step 606 or to include in following publication step 608 (using similar logic as outlined in step 604 above), in the case where the time ID of the delete command 502*a,b,c,d* is inside of the AGP period.

At step 610, the publication 16 is sent to the registrars 102. At step 612, the next scheduled drop zone session opens (as dictated by the current publication 16) and then the registrars 102 can submit their registration requests 15, for consideration by the control module 108 as discussed above by example.

Figure 7:
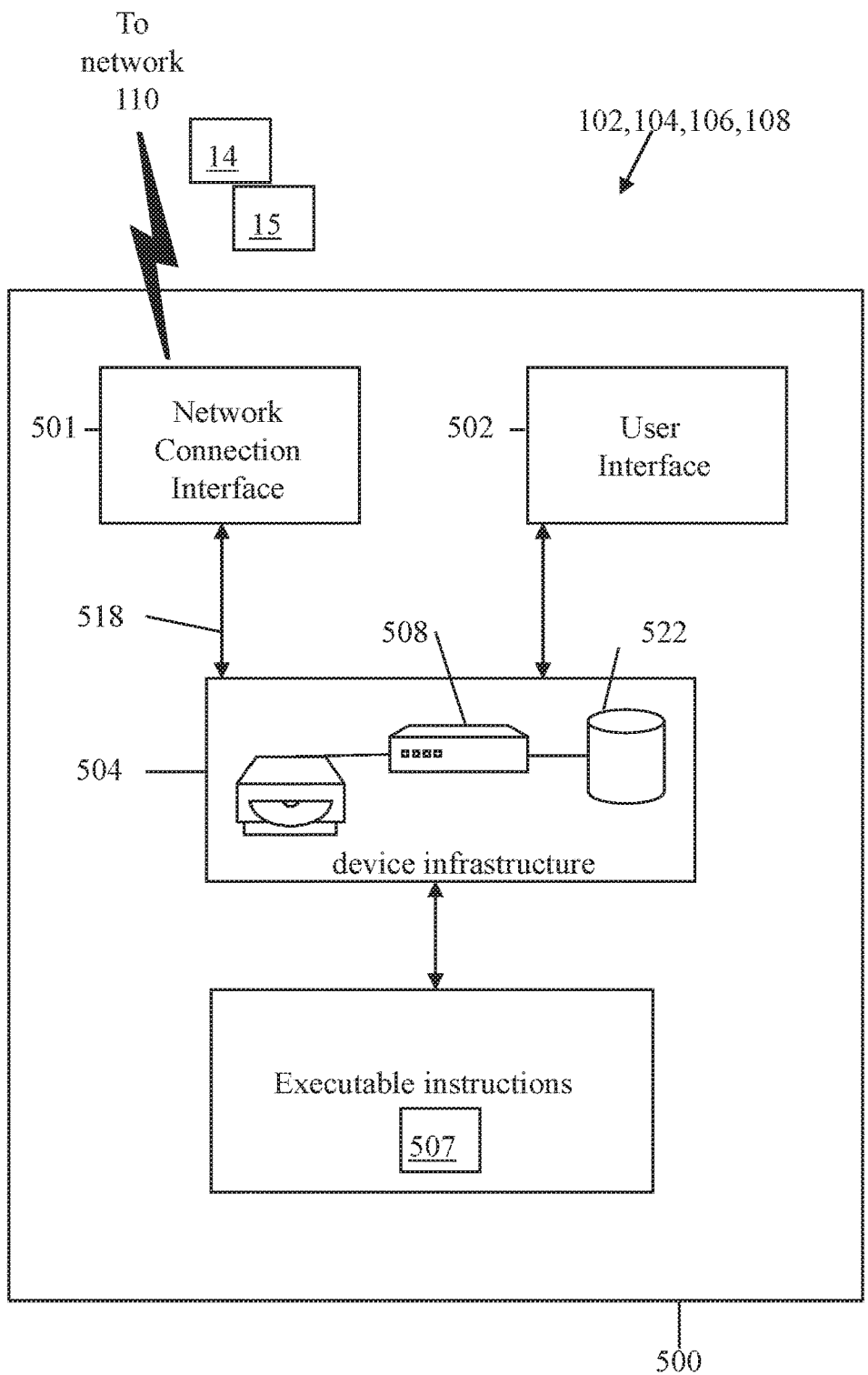
FIG. 7 is an example embodiment of the servers of the drop zone infrastructure of FIG. 1.

Referring to FIG. 7, shown is such that operation of the device 500 (as implemented by any of the registrar 102, drop zone server 104, main registry server 106 and/or control module 108) is facilitated by the device infrastructure 504. The device infrastructure 504 includes one or more computer processors 508 and can include an associated memory 522. The computer processor 508 facilitates performance of the device 500 configured for the intended task (e.g. of the respective operation of any of the servers 102, 104, 106, 108 as described) through operation of the network interface 501, the user interface 502 and other application programs/hardware of the device 500 by executing task related instructions. These task related instructions can be provided by an operating system, and/or software applications located in the memory 522, and/or by operability that is configured into the electronic/digital circuitry of the processor(s) 508 designed to perform the specific task(s). Further, it is recognized that the device infrastructure 504 can include a computer readable storage medium coupled to the processor 508 for providing instructions to the processor 508 and/or to load/update the instructions 507. The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 500 can include the executable applications comprising code or machine readable instructions for implementing predetermined functions/operations including those of an operating system and the modules, for example. The processor 508 as used herein is a configured device and/or set of machine-readable instructions for performing operations as described by example above, including those operations as performed by any or all of the modules. As used herein, the processor 508 may comprise any one or combination of, hardware, firmware, and/or software. The processor 508 acts upon information by manipulating, analyzing, modifying, converting or transmitting information for use by an executable procedure or an information device, and/or by routing the information with respect to an output device. The processor 508 may use or comprise the capabilities of a controller or microprocessor, for example. Accordingly, any of the functionality of the modules may be implemented in hardware, software or a combination of both. Accordingly, the use of a processor 508 as a device and/or as a set of machine-readable instructions is hereafter referred to generically as a processor/module 508 for sake of simplicity.

It will be understood in view of the above that the computing devices 500 may be, although depicted as a single computer system, may be implemented as a network of computer processors, as desired.

As another example, consider the case when the limited resources are auction items rather than previously used domain names 14. The drop zone server 104 can open to bids on all items for which the auction is expiring during a given time period. Similarly to the embodiment described above, bidders would have to prioritize their bid, rather than being able to focus on each auction item. This, in turn, increases the likelihood that more bidders will be successful in at least one bid.

Although the invention has been described with reference to certain specific embodiments, various modifications thereof will be apparent to those of ordinary skill in the art without departing from the scope of the invention as defined by the appended claims.

What is claimed is:

1. A server for distributing a domain name to one of a plurality of registrars, the server in communication with a drop zone server, the server having stored instructions for execution by a computer processor to:
maintain a delete queue containing a plurality domain names;
release the plurality of domain names from the delete queue to the drop zone server using a first drop zone server entry point when the plurality of domain names reaches an end of the delete queue;
recognize a delete command of the domain name;
determine if the delete command is inside or outside of an Add Grace Period (AGP), the AGP defined as a period of time post registration of the domain name by a registrar;
if the delete command is inside of the AGP, then send the domain name to the drop zone server using a second drop zone server entry point in a path that bypasses the delete queue, the second drop zone server entry point being separate from the first drop zone server entry point; or
if the delete command is outside of the AGP, then send the domain name to the delete queue, wherein once when the domain name reaches the end of the delete queue, the domain name is released to the drop zone server using the first drop zone server entry point;
wherein the plurality of domain names and the domain name when present in the drop zone server are available for subsequent purchase by said plurality of registrars.

2. The server of claim 1, wherein a time stamp ID of the delete command is compared to a create time ID of the domain name in order to implement said determine.

3. The server of claim 1, wherein the AGP has a start point and an end point, the end point being before a defined expiry data of the domain name, the start point being associated with a create time ID of the domain name.

4. The server of claim 1 further comprising generating a publication to include the domain name as available for an upcoming drop zone session and sending the publication to the plurality of registrars.

5. The server of claim 1 further comprising identifying the domain name at an end of the delete queue and sending the domain name to the drop zone server.

6. The server of claim 1, wherein the delete command is one of a plurality of different types of delete commands.

7. The server of claim 6, wherein the delete command is a pre AGP delete command or a post AGP delete command.

8. The server of claim 1, wherein the delete command is generated by the registrar.

9. The server of claim 1, wherein the delete command is generated by the server.

10. The server of claim 1, wherein the path is one of a pair of paths for sending the domain name to the drop zone server.

11. A method for distributing a domain name to one of a plurality of registrars, in communication with a drop zone server, the method executing stored instructions by a computer processor to:
maintain a delete queue containing a plurality domain names;
release the plurality of domain names from the delete queue to the drop zone server using a first drop zone server entry point when the plurality of domain names reaches an end of the delete queue;
recognize a delete command of the domain name;
determine if the delete command is inside or outside of an Add Grace Period (AGP), the AGP defined as a period of time post registration of the domain name by a registrar;
if the delete command is inside of the AGP, then send the domain name to the drop zone server using a second drop zone server entry point in a path that bypasses the delete queue, the second drop zone server entry point being separate from the first drop zone server entry point; or
if the delete command is outside of the AGP, then send the domain name to the delete queue, wherein once when the domain name reaches the end of the delete queue, the domain name is released to the drop zone server using the first drop zone server entry point;
wherein the plurality of domain names and the domain name when present in the drop zone server are available for subsequent purchase by said plurality of registrars.

12. The method of claim 11, wherein a time stamp ID of the delete command is compared to a create time ID of the domain name in order to implement said determine.

13. The method of claim 11, wherein the AGP has a start point and an end point, the end point being before a defined expiry data of the domain name, the start point being associated with a create time ID of the domain name.

14. The method of claim 11 further comprising generating a publication to include the domain name as available for an upcoming drop zone session and sending the publication to the plurality of registrars.

15. The method of claim 11 further comprising identifying the domain name at an end of the delete queue and sending the domain name to the drop zone server.

16. The method of claim 11, wherein the delete command is one of a plurality of different types of delete commands.

17. The method of claim 16, wherein the delete command is a pre AGP delete command or a post AGP delete command.

18. The method of claim 11, wherein the delete command is generated by the registrar.

19. The method of claim 11, wherein the delete command is generated by a server other than the registrar.

20. The method of claim 11, wherein the path is one of a pair of paths for sending the domain name to the drop zone server.

* * * * *